(12) United States Patent
Johnson et al.

(10) Patent No.: US 8,191,099 B2
(45) Date of Patent: May 29, 2012

(54) AUTOMATED ANALYSIS OF COLLECTED FIELD DATA FOR ERROR DETECTION

(76) Inventors: Lee R. Johnson, Lawrenceville, GA (US); James Michael Blackmon, Lawrenceville, GA (US); William Felts, III, Buford, GA (US)

( * ) Notice: Subject to any disclaimer, the term of this patent is extended or adjusted under 35 U.S.C. 154(b) by 735 days.

(21) Appl. No.: 11/413,522

(22) Filed: Apr. 28, 2006

(65) Prior Publication Data

US 2007/0256114 A1    Nov. 1, 2007

(51) Int. Cl.
*H04N 7/173* (2011.01)
*G06F 11/00* (2006.01)

(52) U.S. Cl. .......... 725/107; 725/105; 714/26; 714/47.3

(58) Field of Classification Search .................. 725/105, 725/107, 124, 125; 714/26, 47.3
See application file for complete search history.

(56) References Cited

U.S. PATENT DOCUMENTS

| | | | |
|---|---|---|---|
| 4,977,390 A | 12/1990 | Saylor et al. | |
| 5,463,768 A | 10/1995 | Cuddihy et al. | |
| 6,738,928 B1 * | 5/2004 | Brown | 714/26 |
| 6,948,092 B2 * | 9/2005 | Kondo et al. | 714/12 |
| 7,076,399 B2 * | 7/2006 | Godara | 702/183 |
| 2003/0226059 A1 * | 12/2003 | Braun | 714/20 |
| 2006/0031905 A1 * | 2/2006 | Kwon | 725/108 |
| 2006/0218600 A1 * | 9/2006 | Johnson | 725/87 |
| 2007/0079289 A1 * | 4/2007 | MacCaux | 717/124 |
| 2008/0066083 A1 * | 3/2008 | Ladd et al. | 719/318 |

FOREIGN PATENT DOCUMENTS

| | | |
|---|---|---|
| EP | 1 092 982 A1 | 4/2001 |
| WO | WO 00/74193 A1 | 12/2000 |
| WO | WO 02/086726 A1 | 10/2002 |
| WO | WO 2004/114133 A1 | 12/2004 |

* cited by examiner

*Primary Examiner* — Kristine Kincaid
*Assistant Examiner* — Gigi L Dubasky
(74) *Attorney, Agent, or Firm* — Merchant & Gould (57) ABSTRACT

Included are embodiments of a method for detecting errors in a set top terminal (STT). At least one embodiment of a method includes receiving error data related to at least one error that occurred in at least one STT and comparing the received error data to at least one signature file, the at least one signature file including a pattern related to at least one documented error. Additional embodiments of the method may also include in response to determining that the received error data does not match the pattern related to at least one documented error, creating a new signature file, the new signature file including at least one pattern associated with the received error data.

16 Claims, 9 Drawing Sheets

AUTOMATED ANALYSIS OF COLLECTED FIELD DATA FOR ERROR DETECTION

TECHNICAL DESCRIPTION

The present disclosure is related to error detection in a data network and, more specifically, to the collection and analysis of field data for error detection.

BACKGROUND

To receive data in the form of programs, including television programs, movies, special events, and other content instances, etc., many consumers subscribe to content services. Depending on the particular services received, many consumers rent and/or purchase one or more set top terminals (STT) to facilitate the display of the received content. As STTs are developed with more functionality, more problems can occur within the STT. As more problems occur with STTs, developers of STTs may desire to determine the problems that occur when the STT is in use. As such, many STTs are designed with the functionality to send error data to a system administrator for determining the cause and solution of the error. As the size of the data network increases, more and more data can be sent to the system administrator. Because this data can become overwhelming to the system administrator, a way to organize and process the received data is desired.

Thus, a heretofore unaddressed need exists in the industry to address the aforementioned deficiencies and inadequacies, among others.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Figure 1:
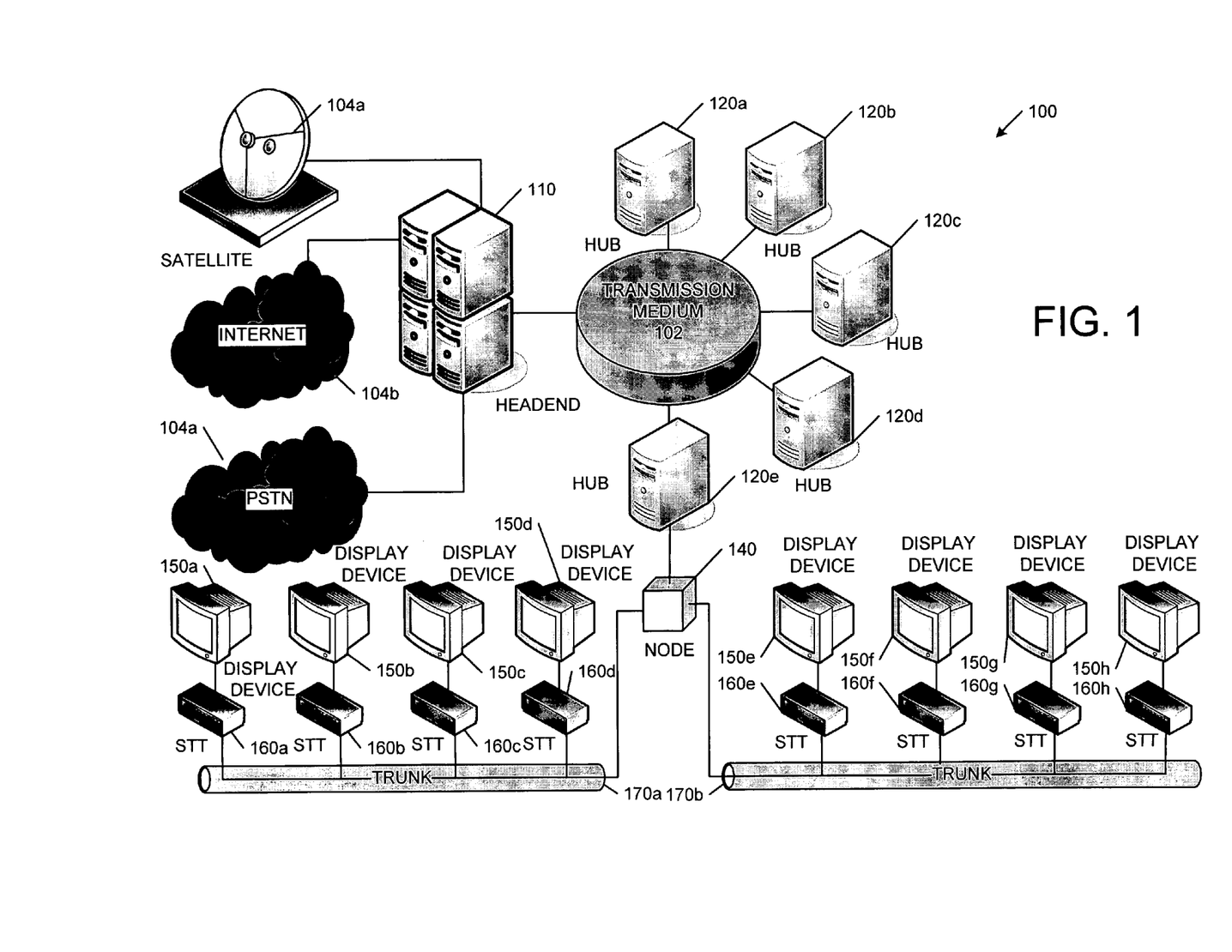
FIG. 1 is an embodiment of a data network for providing programming data to any of a plurality of set top terminals.

FIG. 1 is an embodiment of a data network for providing programming data to any of a plurality of set top terminals. More specifically, the components illustrated in FIG. 1 can generally be implemented as part of a cable television system (CTS) 100. FIG. 1 shows a view of a CTS 100, which can take the form a network system that can deliver video, audio, voice and data services to set top users. Although FIG. 1 depicts a high level view of a CTS 100, one can appreciate that any of a plurality of different cable television systems can tie together a plurality of networks into an integrated global network so that STT users can receive content provided from anywhere in the world.

The CTS 100 can be configured to provide programming signals as digitally formatted signals in addition to delivering analog programming signals. Further, CTS 100 can be configured to support one way broadcast services as well as both one way data services and two way media and data services. The two way operation of the CTS 100 can allow for user interactivity with services, such as Pay-Per-View programming, Near Video-On-Demand (NVOD) programming according to any of several known NVOD implementation methods, View-on-Demand (VOD) programming (according to any of several known VOD implementation methods), and interactive applications, such as Internet connections and interactive media Guide (IMG) applications.

The CTS 100 may also be configured to provide interfaces, network control, transport control, session control, and servers to access content and services, and distributes content and services to STT users. As shown in FIG. 1, at least one embodiment of CTS 100 includes a headend 110 and a plurality of hubs 120 coupled to a transmission medium 102. The transmission medium 102 can include any configuration of networking logic for providing communication capabilities between components in the CTS 100. Additionally included in the nonlimiting example of FIG. 1 is a node 140 coupled to hub 120e. Coupled to the node 140 are trunks 170a and 170b. The trunks can facilitate the communication of programming data to the plurality of set top terminals (STTs) 160a-160h. Display of the received data can be provided by display devices 150a-150h.

Additionally, the network can be configured to transmit media content to a headend for further transmission to users downstream in the network. Data provided by a content provider (such as via satellite 104a, Internet 104b, Public Switched Telephone Network (PSTN) 104c, etc.) can be communicated by the content provider to the headend 110. From the headend, the received data may then be communicated over a transmission medium 102 that includes one or more hubs 120a-120e. The hubs 120 can be coupled to one or more nodes 140, each of which may serve a local geographical area. The node 140 is connected to trunks 170a and 170b, which are connected to network STTs 160. As one of ordinary skill in the art will understand, CTS 100 shown in FIG. 1 is merely illustrative and should not be construed as implying any limitations upon the scope of the present invention.

One can appreciate that although a single headend 110 is illustrated in FIG. 1, a CTS 100 can feature any of a plurality headends 110. Similarly, other components may be added to the CTS 100 and/or removed from CTS 100, depending on the desired functionality.

Figure 2:
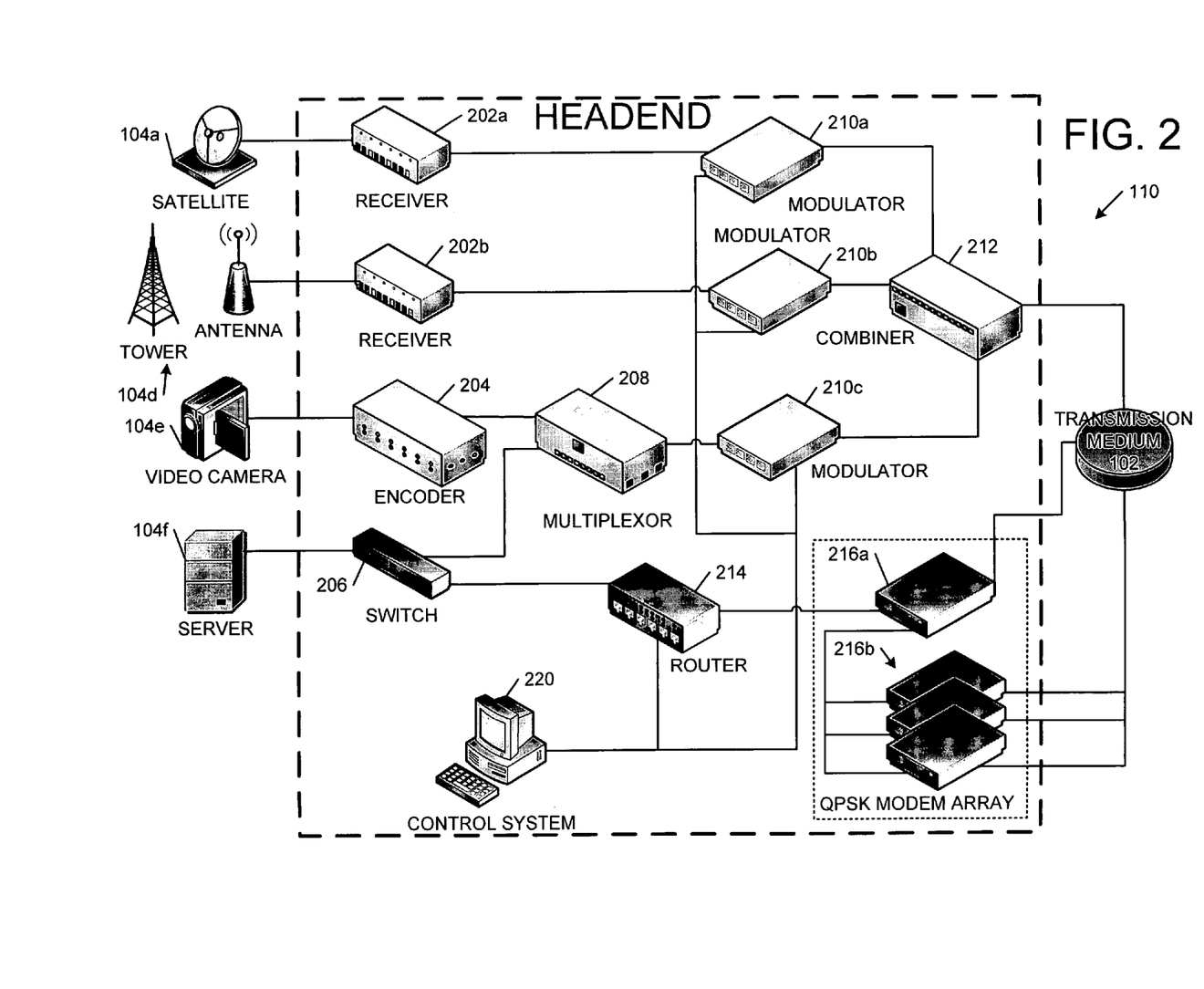
FIG. 2 is an embodiment of a headend that may be configured to provide programming data to any of a plurality of set top terminals, as well as receive error data from an STT, such as the STT from FIG. 1.

FIG. 2 is an embodiment of a headend that may be configured to provide programming data to any of a plurality of set top terminals, as well as receive error data from the set top terminals, similar to the headend from FIG. 1. More specifically, FIG. 2 is a diagram illustrating various components that may be present at a headend for providing programming services to users of STTs. As discussed above, services provided by the headend 110 can include broadcast programming, media-on-demand, as well as other services.

Included in headend 110 are receivers 202a and 202b, which are coupled to satellite 104a and antenna 104d. As discussed above, programming data can be received from any of a plurality of different sources including (but not limited to) those illustrated in FIGS. 1 and 2. As such, data can also be received from video camera 104e by encoder 204 and/or from server 104f by switch 206. Multiplexor 208 is coupled to encoder 204 and switch 206. Additionally, switch 206 is coupled to router 214. Also coupled to router 214 is control system 220. Router 214 is also coupled to Quadrature Phase Shift Keying (QPSK) modem array, which can include modem 216a and modems 216b. The QPSK modems 216 can be configured to be responsible for transporting out-of-band Internet Protocol (IP) data traffic between the distribution headend 110 and at least one of the STTs, 160 which can send data to at least one of the display devices 150. Data from the QPSK modem 216 can be routed by the headend 110. The headend 110 can also be responsible for delivering upstream application traffic to the various server applications associated with the headend 110.

Additionally, modulators 210a, 210b, and 210c, which are coupled to receiver 202a, receiver 202b, and multiplexor 208, respectively (as well as control system 220) are coupled to combiner 212. Combiner 212, as well as QPSK modem array 216 are coupled to transmission medium 102.

While not included in the nonlimiting example of FIG. 2, other elements may also be included in a headend for providing various services to users of STTs 160. Examples of such components can include components for providing management, monitoring, and control of the network's 100 elements and broadcast services provided to users. In one implementation, the headend 110 can include one or more components to facilitate the insertion of in-band broadcast file system (BFS) data into an MPEG-2 transport stream (and/or other transport streams) that is broadcast and received via the STT's 160 communication interface and tuner system (not shown). The headend 110 can also be configured to utilize Digital Storage Media Command and Control (DSMCC) protocol to set up and maintain Media on Demand (MOD) sessions (e.g., video on demand). Other embodiments can also be configured to process user to network (U-N) session signaling messages, manage allocation of session-related network resources, support network management operations, act as a point of contact to the network 100 for the STTs to establish individual sessions, and support MOD services.

Figure 3:
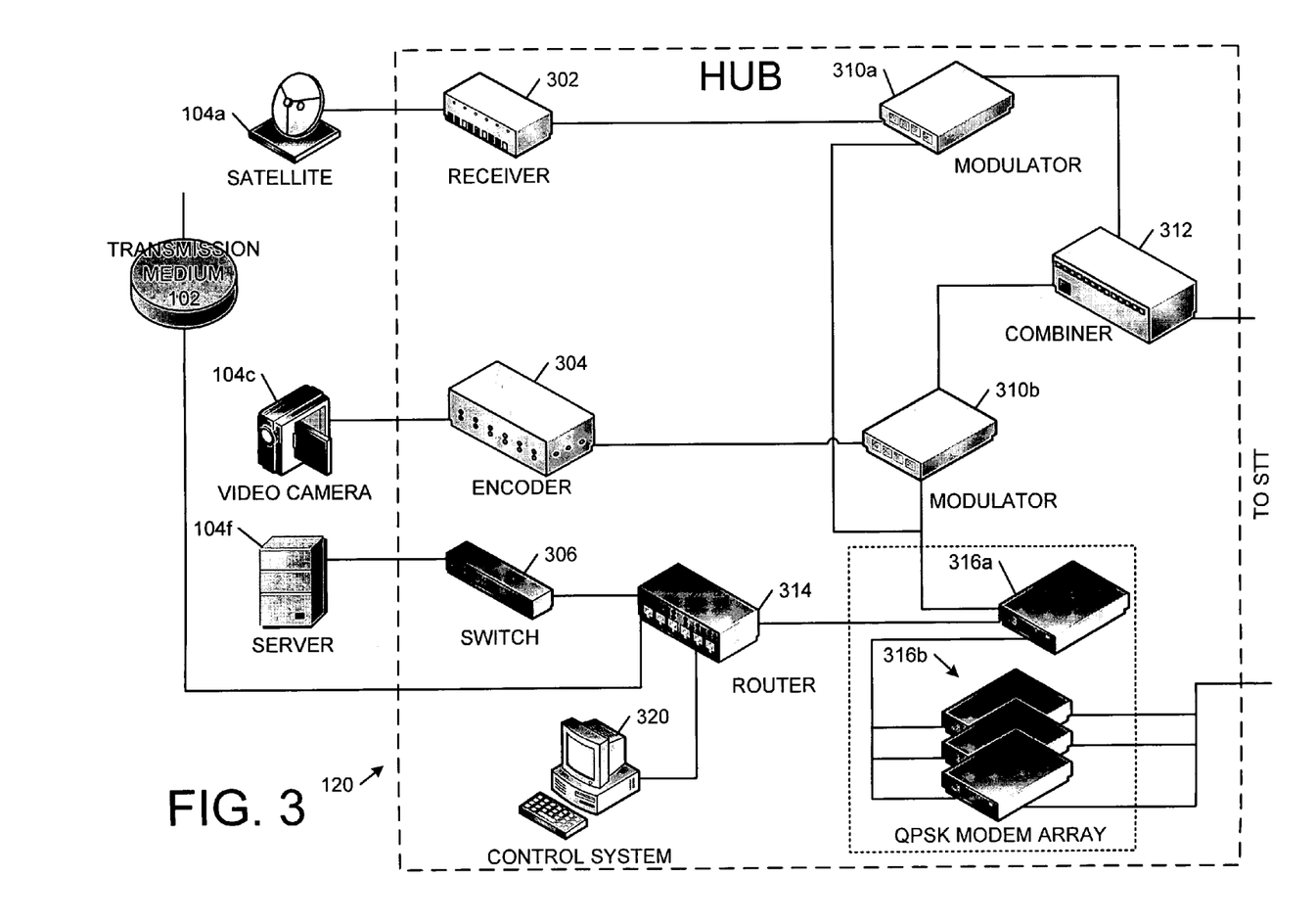
FIG. 3 is an embodiment of a hub that may be configured to facilitate communication of data between the STTs and the headend from FIGS. 1 and 2.

FIG. 3 is an embodiment of a hub that may be configured to facilitate communication of data between the STTs and the headend from FIGS. 1 and 2. Similar to the headend configuration 110 from FIG. 2, a hub 120 can include a receiver 302, an encoder 304, and a switch 306 for receiving data from various sources, such as satellite 104a, video camera 104e, and server 104f. Additionally, hub 120 can include a router 314 that can be coupled to switch 306, control system 320, and transmission medium 102. As one of ordinary skill in the art will understand, data received from transmission medium 102 can originate from headend 110, another hub 150, a node 140, or other network component, such as those illustrated in FIG. 1.

Additionally included in the nonlimiting example of hub 120 from FIG. 3 are modulators 310a and 310b. The modulators can be coupled to receiver 302 and encoder 304, as well as QPSK modems 316a and 316b. Also coupled to QPSK modem array 316 is router 314. Data from combiner 312 and QPSK modem array 316 may be sent to and/or received from a node 140 (FIG. 1) and/or other components associated with the network 100.

In operation, STTs 160 can be configured to receive programming and other data from the hubs 120 and/or headend 110. As the STTs 160 process the received data, errors can occur within the STT 160. In addition to including logic for processing data received from the headend 110, many STTs 160 are also equipped with logic for reporting errors to the network 100. As a nonlimiting example, some STTs 160 may be configured to periodically report errors that have occurred over a predetermined period of time. More specifically, an STT may be configured to send an error log 650 (FIG. 6) to the headend 110 (hub 120, and/or other component) every 24 hours. Other embodiments can be configured such that the STT can report errors upon a reboot, after an error has occurred, in an aperiodic manner, and/or in a poll from control system 220, 320. Regardless of the configuration for sending errors, a system administrator can then compile the data to determine common errors of the STTs 160. While compiling the received data can provide valuable information regarding the operation of STTs in the network, as there may be numerous STTs coupled to network 100, the amount of data can become overwhelming.

Figure 6:
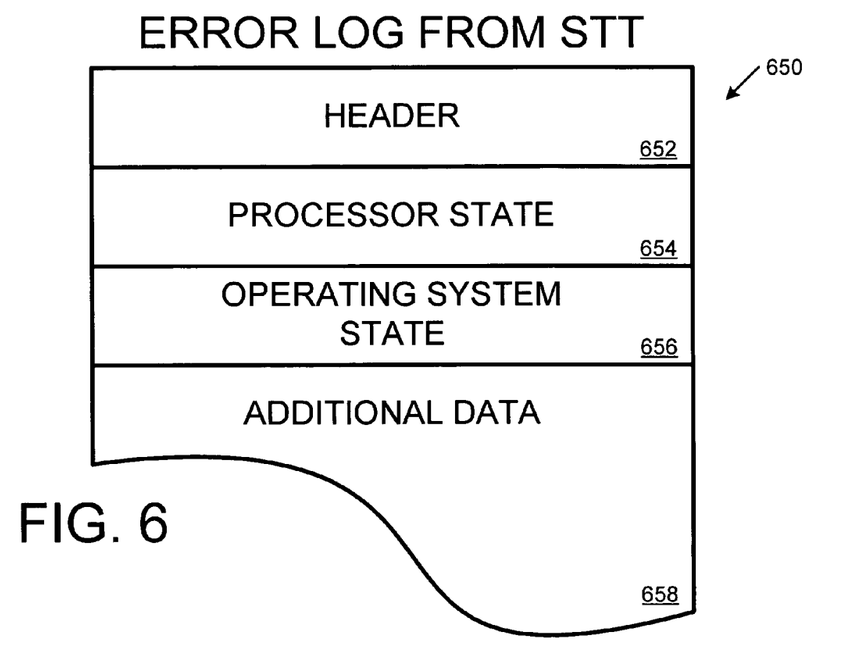
FIG. 6 is a block diagram illustrating an embodiment of an error log that may be created by an STT, such as an STT from FIG. 1.

One aspect of this disclosure can include the creation and processing of an error log 650 (FIG. 6). More specifically, as discussed above, STTs can be configured to create and send an error log 650 to the headend 110. When an error occurs in an STT 160, the STT can compile various information related to the current state of the STT 160, including the version of software being run on the STT 160, processor state, error attributes, subroutine that was being executed during the error, time of the error, etc., as discussed in more detail below. Once the error log 650 is created, the STT 160 can send the data to a control system 220, 320, which may be located on the headend 110, at a hub 120, or elsewhere on the CTS 100.

The error logs collection software 488 (FIG. 4) can be configured to receive data from STTs 160. Once the error logs collection software 488 receives and compiles data from any number of STTs 160 into a master log file, the master log file can be sent to a control system for executing a piece of logic (e.g., error logs processing software 490) for processing the received error data.

The error logs processing software 490 can also be configured to separate each log file such that error data received from the STTs 160 can be analyzed. Upon separating the log file, a determination can be made whether an error is a known problem. If the error is a known problem, an Error identifier (EI) can be assigned to the error and the error can be documented accordingly. If, on the other hand, the error is not a known problem, a new EI can be assigned to this error pattern and a signature file can be created to identify future errors with similar characteristics.

One should note that while the description above refers to a centrally located control system 320, this is a nonlimiting example. More specifically, at least one embodiment includes a distributed system that includes a plurality of operators with processing software 490 on their respective client devices. These client devices can be communicatively coupled to the headend 110 and/or hub 120 for providing the desired functionality.

Figure 4:
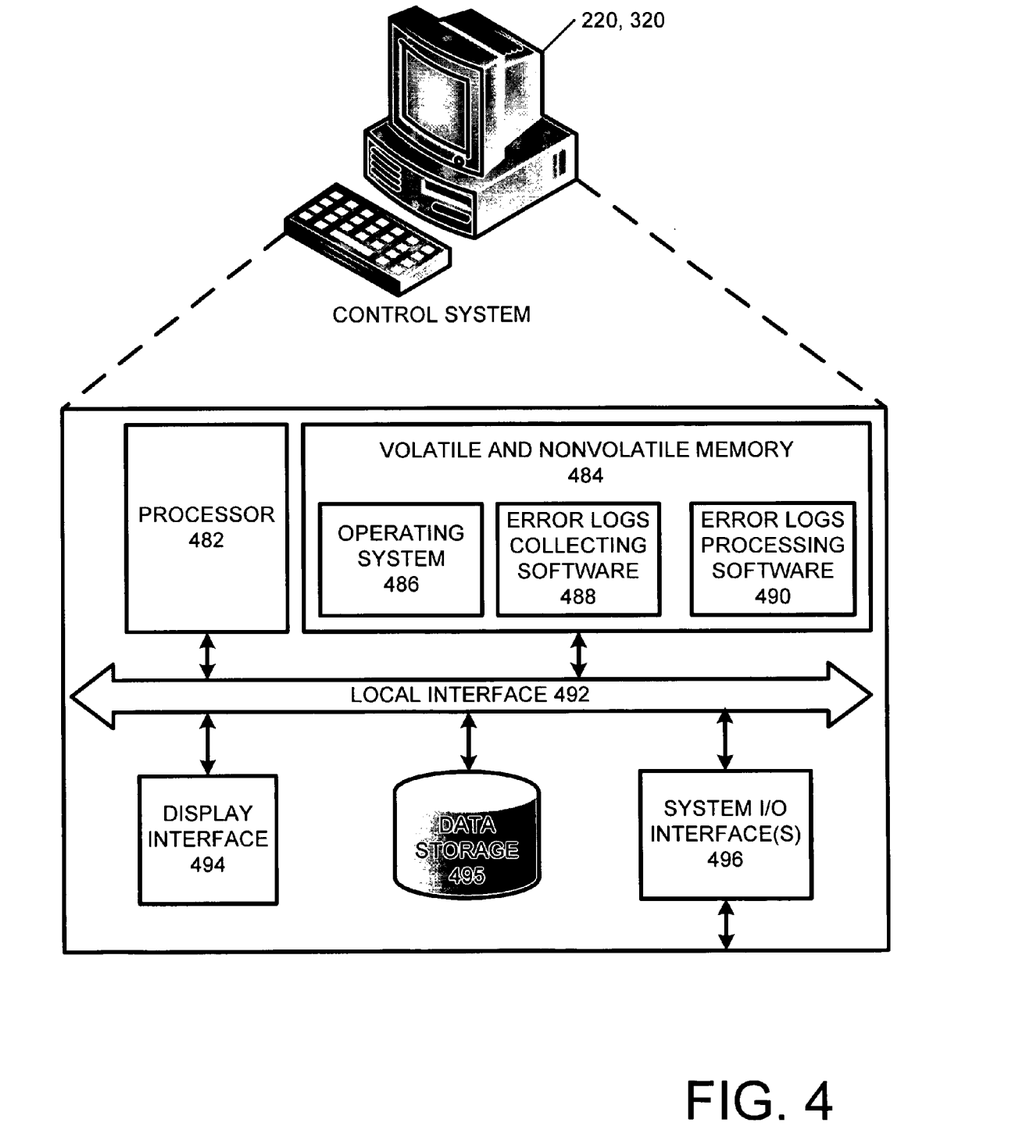
FIG. 4 is an embodiment of a control system that may be configured to facilitate the communication of data to and from the STTs, as illustrated in FIGS. 2 and 3.

FIG. 4 is an embodiment of a control system that may be configured to facilitate the communication of data to and from the STTs, as illustrated in FIGS. 2 and 3. Although the control system of FIG. 4 is illustrated as a personal computer, this discussion can be applied to any device that can be configured for providing the desired functionality. Generally, in terms of hardware architecture, as shown in FIG. 4, the control system 220, 320 includes a processor 482, volatile and nonvolatile memory 484, a display interface 494, data storage 495, and one or more input and/or output (I/O) device interface(s) 496 that are communicatively coupled via a local interface 492. The local interface 492 can include one and/or more buses or other wired or wireless connections. The local interface 492 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 482 may be a hardware device for executing software, particularly software stored in volatile and nonvolatile memory 484.

The processor 482 can be any custom made or commercially available processor, a central processing unit (CPU), an auxiliary processor among several processors associated with the control system 220, 320, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard® Company, an 80x86 or Pentium® series microprocessor from Intel® Corporation, a PowerPC® microprocessor from IBM®, a Sparc® microprocessor from Sun Microsystems®, Inc, or a 68xxx series microprocessor from Motorola® Corporation.

The volatile and nonvolatile memory 484 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 484 may incorporate electronic, magnetic, optical, and/or other types of storage media. Note that the volatile and nonvolatile memory 484 can have a distributed architecture, where various components are situated remote from one another, but can be accessed by the processor 482. Additionally, volatile and nonvolatile memory 484 can include an operating system 486, error logs collecting software 488, and error logs processing software 490. As one of ordinary skill in the art will understand, while the operating system 486, error collecting software 488, and error logs processing software 490 are illustrated as three software components within the same memory unit 484, this is a nonlimiting example. More specifically, one or more of these software components may be combined. Similarly, while control system 220, 320 is illustrated as including an operating system 486, error logs collecting software 488, and error logs processing software 490, one should note that, depending on the particular configuration, control system 220, 320 may include only a portion of these components and/or functionality. Additionally, while these components are illustrated as software modules, as one of ordinary skill in the art will understand, this logic can be represented in one or more components of hardware, firmware, etc.

Additionally, the operating system 486 in volatile and nonvolatile memory 484 may include one or more separate programs, each of which includes an ordered listing of executable instructions for implementing logical functions. A nonexhaustive list of examples of suitable commercially available operating systems is as follows: (a) a Windows® operating system available from Microsoft® Corporation; (b) a Netware® operating system available from Novell®, Inc.; (c) a Macintosh® operating system available from Apple® Computer, Inc.; (d) a UNIX operating system, which is available for purchase from many vendors, such as the Hewlett-Packard® Company, Sun Microsystems®, Inc., and AT&T® Corporation; (e) a LINUX operating system, which is freeware that is readily available on the Internet 100; (f) a Vxworks® operating system from WindRiver® Systems, Inc.; and/or (g) an appliance-based operating system, such as that implemented in handheld computers or personal data assistants (PDAs) (e.g., PalmOS® available from Palm® Computing, Inc., and Windows CE® available from Microsoft® Corporation). The operating system 486 essentially controls the execution of other computer programs and provides scheduling, input-output control, file and data management, memory management, and communication control and related services.

A system component embodied as software may also be construed as a source program, executable program (object code), script, and/or any other entity comprising a set of instructions to be performed. When constructed as a source program, the program is translated via a compiler, assembler, interpreter, or the like, which may or may not be included within the volatile and nonvolatile memory 484, so as to operate properly in connection with the Operating System 486.

The Input/Output devices that may be coupled to system I/O Interface(s) 496 may include input devices, for example but not limited to, a keyboard, mouse, scanner, microphone, etc. Further, the Input/Output devices may also include output devices, for example but not limited to, a printer, display, speaker, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

If the control system 220, 320 is a personal computer, workstation, or the like, the software in the volatile and nonvolatile memory 484 may further include a basic input output system (BIOS) (omitted for simplicity). The BIOS is a set of software routines that initialize and test hardware at startup, start the Operating System 486, and support the transfer of data among the hardware devices. The BIOS is stored in ROM so that the BIOS can be executed when the control system 220, 320 is activated.

When the control system 220, 320 is in operation, the processor 482 may be configured to execute software stored within the volatile and nonvolatile memory 484, to communicate data to and from the volatile and nonvolatile memory 484, and to generally control operations of the control system 220, 320 pursuant to the software. Software in memory, in whole or in part, are read by the processor 482, perhaps buffered within the processor 482, and then executed.

Figure 5:
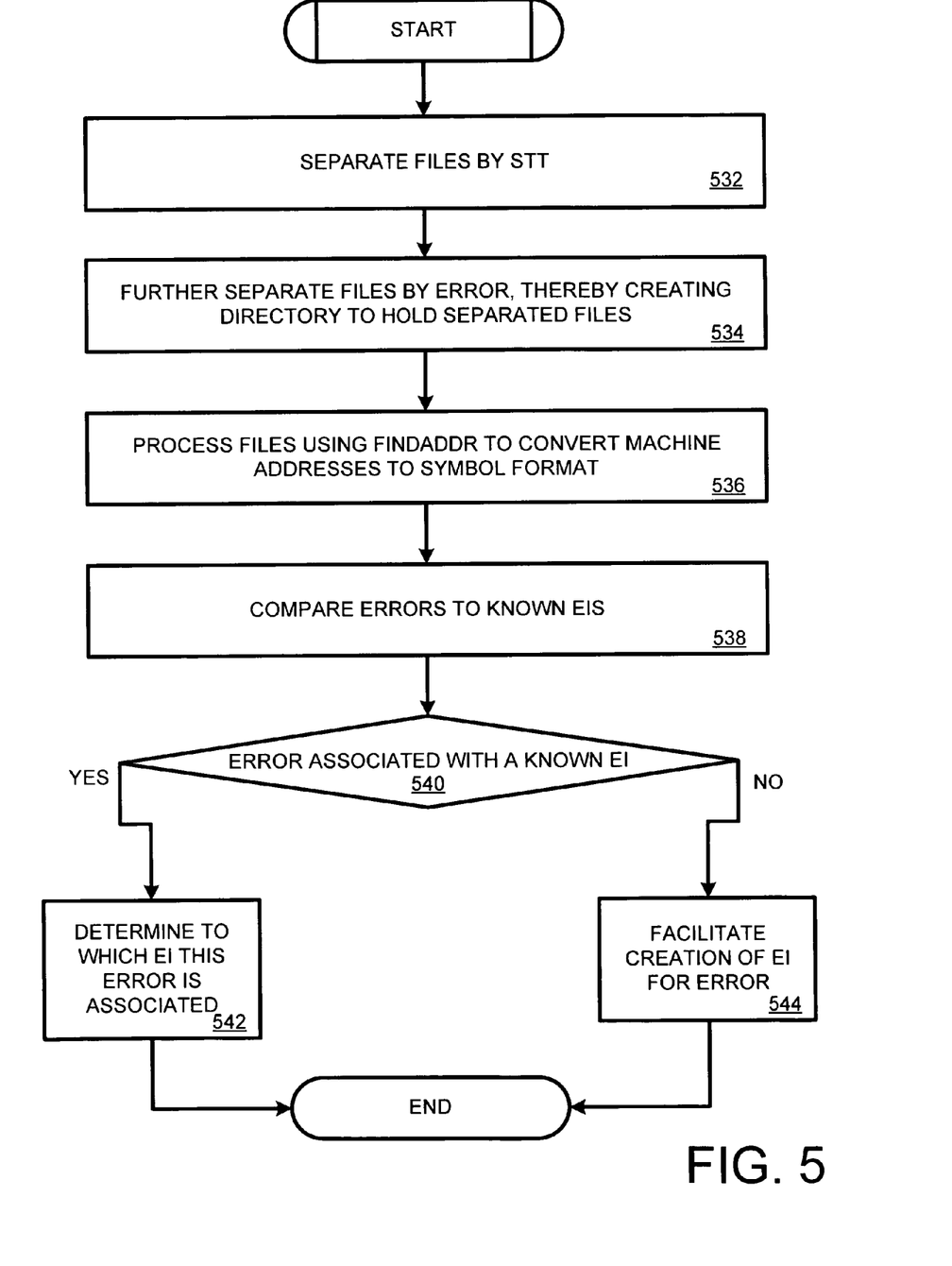
FIG. 5 is a flowchart illustrating an embodiment of steps that can be taken in determining errors in at least one STT, such as a STT from FIG. 1.

FIG. 5 is a flowchart illustrating an embodiment of potential steps that can be taken in determining errors in at least one STT, such as a STT from FIG. 1. More specifically, a master log file (750 from FIG. 7) is created from error data received from at least one STT. A control system 220, 320 (and/or other computing device) configured with processing software 490 can separate the received master log file 750 according to STT 160 (block 532). Next, the processing can further separate data according to error, as an STT can be configured to send data related to one or more errors (block 534). By separating the master log file 750 the processing software 490 can create a directory for the separated files.

The processing software 490 can then process files using a find address function to convert machine addresses to symbol format (block 536). More specifically, the find address function may be configured to resolve machine addresses in a log file to human readable form. As a nonlimiting example, machine addresses for a particular symbol can vary among STTs 160. In order to match errors across multiple STTs 160, signature files can be configured to utilize symbols instead of machine addresses. Next, the processing logic can compare the errors to known EIs, via for example, at least one signature file (step 538). When a match is found, the header data can indicate the particular EI. The next step in this nonlimiting example is to determine whether the error is associated with a known EI (block 540). If the error is associated with a known EI, the processing software 490 determines to which EI this error is associated (block 542). If, on the other hand, the error is not associated with a known EI, the processing software 490 can facilitate the creation of a new EI (and/or signature file) for this error (block 544).

FIG. 6 is a block diagram illustrating an embodiment of an error log that may be created by an STT, such as an STT from FIG. 1. More specifically, error log 650 includes a header 652, which may be configured to identify the STT. In at least one embodiment the header may include an Internet Protocol (IP) address associated with the STT. However other identifiers including a Media Access Control (MAC) address and/or other identifiers could be used. Also included in the error log is a processor state field 654. The processor state can relay information related to the condition of the STT's 160 processor when the error occurred. Similarly, an operating system state 656 can also be included in error log 650. Additional data 658 may include other information, such as the type of STT and other data related to the error. As discussed above, the STT can send the error log 650 to the error collection software 488 at predetermined intervals, upon receiving an error, or at other times. Additionally, while the discussion above indicates that a single error may be present in the error log 650 sent from the STT, this is a nonlimiting example. More specifically, depending on the particular configuration, multiple errors may be present in a single error log 650. In such a scenario, data in the error log 650 may be configured to identify each of the errors that occurred.

Figure 7:
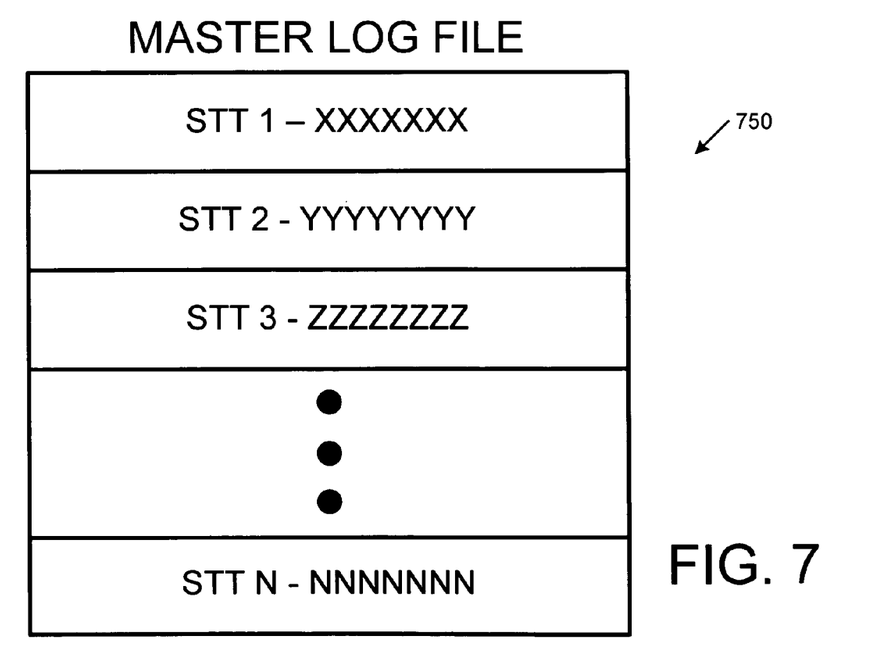
FIG. 7 is an embodiment of a master log file, illustrating data related to a plurality of STTs, such as the STTs from FIG. 1.

FIG. 7 is an embodiment of a master log file, illustrating data related to a plurality of STTs, such as the STTs from FIG. 1. As discussed above, upon receiving error logs 650 from a plurality of STTs 160, the error collection software 488 can be configured to compile the information into a master log file 750. The master log file 750 can include data related to one or more of the STTs from whom data has been received. This master log file 750 can be sent to the error processing software 490 for determining the nature of the errors.

One should note that the master log file illustrated in FIG. 7 is a nonlimiting example. More specifically, in at least one embodiment, a master log file can include data from all STTs that is intermixed throughout the file. As such, while the embodiment of FIG. 7 illustrates that all data related to STT 1 is located on line one, at least one nonlimiting example can provide a master log file where data related to STT 1 is located a plurality of lines. Similarly other STTs in the master log file can be similarly situated.

Figure 8:
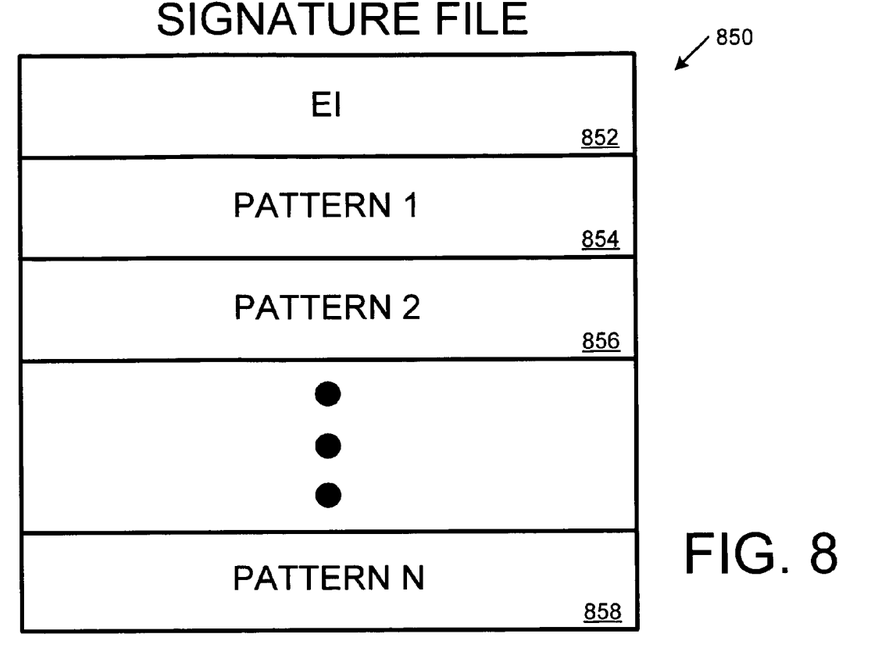
FIG. 8 is an embodiment of a signature file that may be created to determine attributes of an error received from an STT, such as the STT from FIG. 1.

FIG. 8 is an embodiment of a signature file that may be created to determine attributes of an error received from an STT, such as the STT from FIG. 1. More specifically, in at least one embodiment, a signature file 850 can include data related to an error that has occurred in an STT 160. The signature file 850 may be created by an operator (and/or system administrator) upon determining that an error has not previously been documented. To create a signature file 850, the operator can assign an EI to the error, where the EI is a notation for identifying the error. Additionally, the signature file 850 can include one or more patterns 852, 854, 856, and 858 associated with the error. A pattern can include any of a plurality of information, including (but not limited to) at least a portion of the information indicated in the error log 650 (FIG. 6). As a nonlimiting example, the signature file 850 can include data related to the processor state, type of STT 160, the operating system state, as well as other data that can be used to identify this particular error. As discussed above, once the processing software 490 has separated each received error, the error processing software 490 can compare each error to a list of signature files 850 to determine the error type for each error received.

Figure 9:
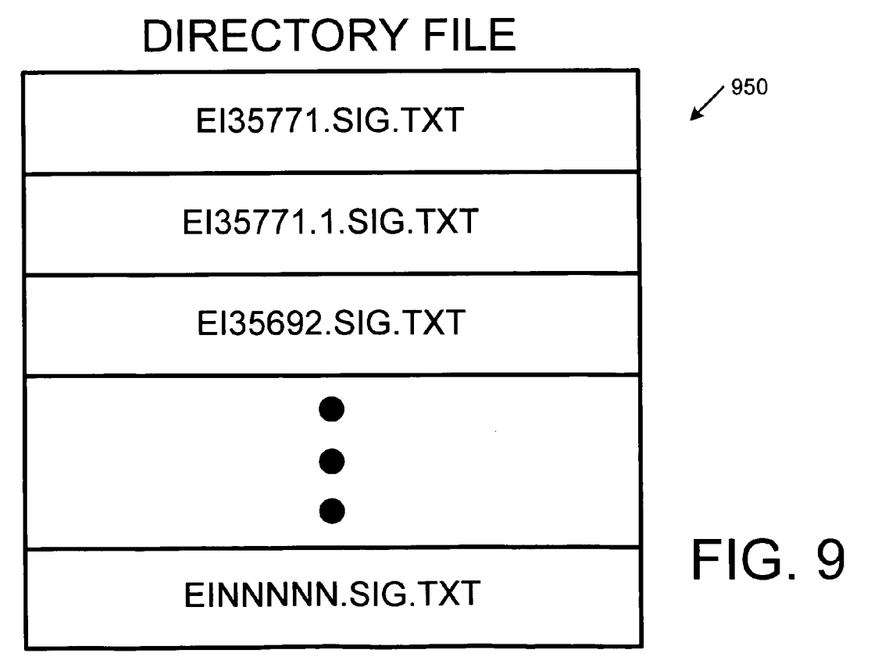
FIG. 9 is an embodiment of a directory file, illustrating a plurality of signature files associated with errors that may occur in an STT, such as the STT from FIG. 1.

FIG. 9 is an embodiment of a directory file, illustrating a plurality of signature files associated with errors that may occur in a STT, such as the STT from FIG. 1. More specifically, the directory file 950 can include a list of files (in this nonlimiting example text files), each associated with an EI. The text files can include data in the signature file associated with that particular error, as disclosed in FIG. 8. One should note that, depending on the particular configuration, the directory file 950 can be organized for quicker classification of errors. As a nonlimiting example, at least one configuration of the directory file 950 can include an organization of signature files 850 according to complexity. In such a configuration, a more complex signature file 850 can be organized in a position before a less complex signature file 850 such that during execution, the more complex signature file is compared with the newly received error prior to the less complex signature file 850.

Figure 10:
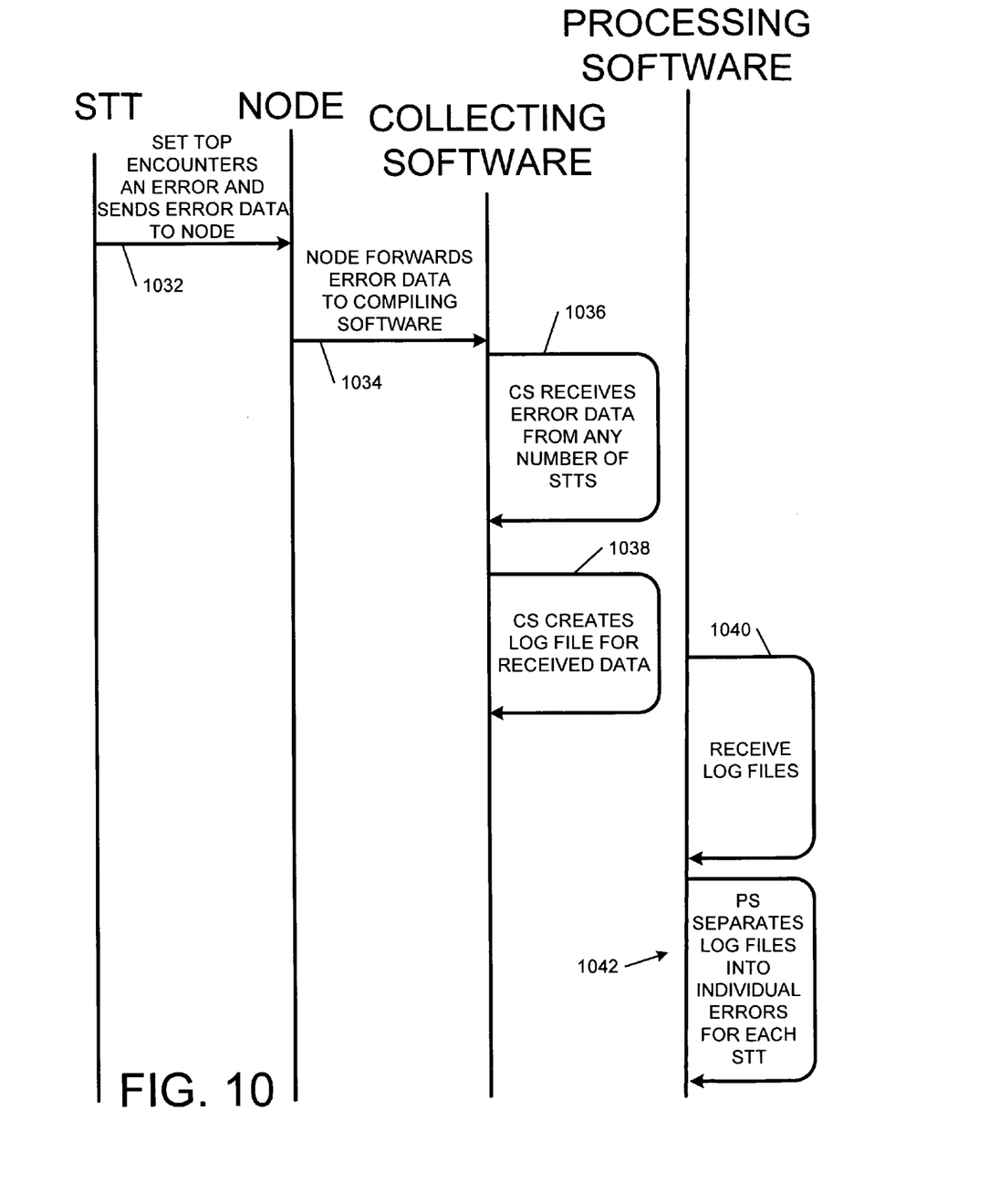
FIG. 10 is a sequence diagram illustrating exemplary steps that may be taken in processing error log files 650, as in the network from FIG. 1.

FIG. 10 is a sequence diagram illustrating exemplary steps that may be taken in processing error log files 650, as in the network from FIG. 1. More specifically, the first step of the nonlimiting example of FIG. 10 is for the set top terminal 160 to encounter an error and send data related to the error to a node 140 (step 1032). As mentioned above, and discussed in more detail below, the error data can take the form of an error log 650 that can include any of a plurality of data related to the STT 160 and the error encountered. Once the STT 160 sends the data, the node 140 can then forward the error data to log collecting software 488 (step 1034), which can be located on a control system 220, 320, or other computing device. Once the error collecting software 488 receives error logs 650 from any number of STTs 160 (step 1036), the error collecting software 488 can create a log file 750 (and/or append an existing log file) for the received data (step 1038). The log file 750 can include data related to each of the STTs who sent an error log 650, however this is not a requirement. Once the log file 750 is created, the processing software 490 can receive the log file 750 (step 1040). The processing software 490, can then separate received log file(s) 750 into individual error occurrences for each STT 160 (step 1042). From this form, the processing software can analyze each error to determine trends with various STTs 160.

Figure 11:
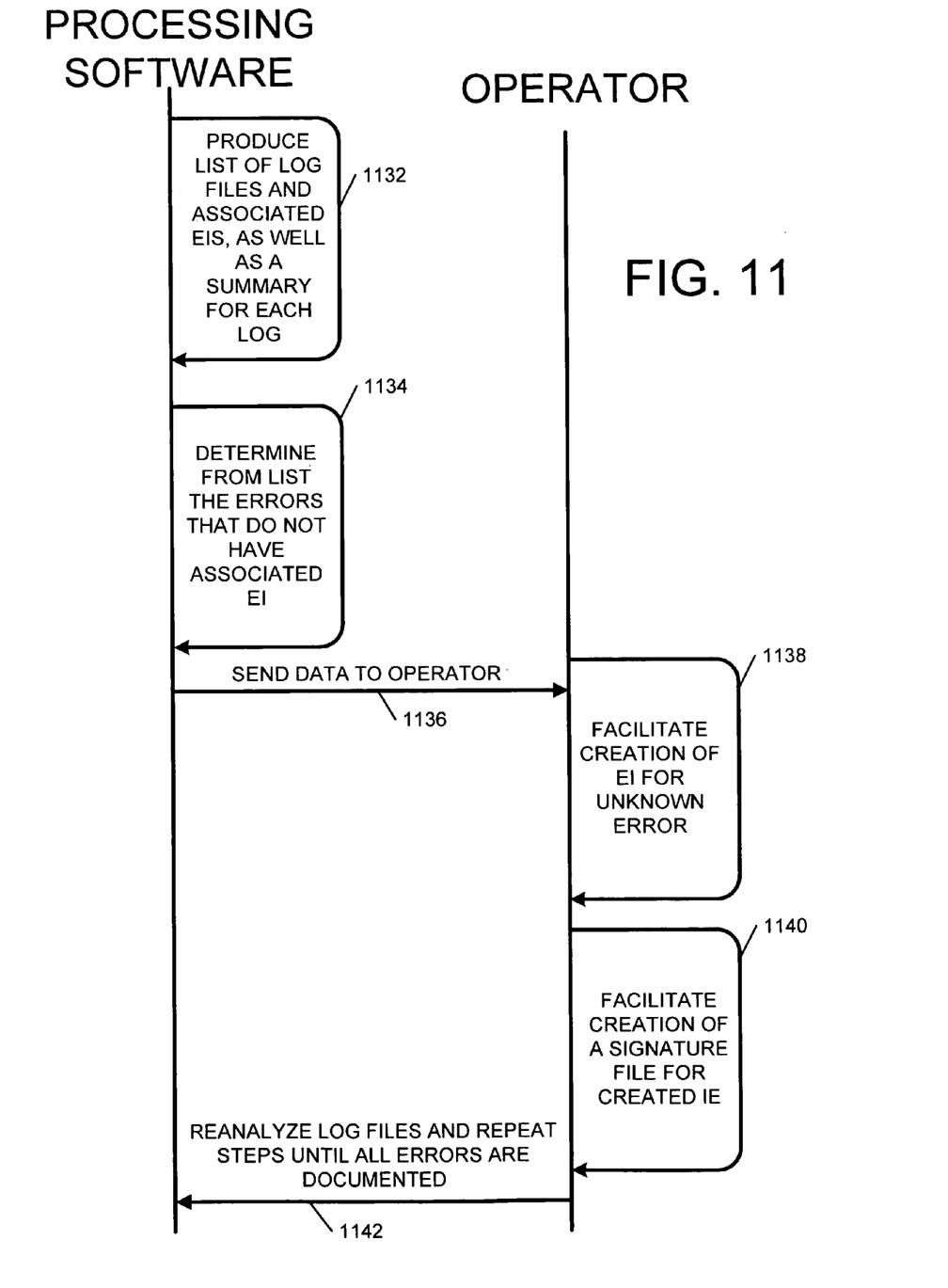
FIG. 11 is a sequence diagram illustrating exemplary steps that may be taken in associating error data with a signature file, similar to the sequence diagram from FIG. 10.

FIG. 11 is a sequence diagram illustrating exemplary steps that may be taken in associating error data with a signature file, similar to the sequence diagram from FIG. 10. More specifically, the error logs processing software 490, may, upon receiving log file(s) 750 associated with a plurality of STTs 160, produce a list of log files 750 and associated EIs, as well as a summary for each (step 1132). The error logs processing software 490 may also be configured to parse out each error from a received log file 750. Upon parsing out the errors, the processing software 490 function can be configured to compare attributes of the errors to attributes of known errors, as indicated in the directory file 950. The processing software 490 can additionally determine those errors that are not associated with known errors (step 1134) and can send this data to a system operator/administrator (step 1136). One should note that while step 1134 indicates that the processing software 490 can determine known and unknown errors, this is a non-limiting example. More specifically, in at least one embodiment, the operator can look at the summary output to see which errors do not have EIs. The operator can sort the output using several criteria to determine which error conditions are most worthwhile for developing signatures (you typically want to create signature(s), which match the most of the remaining errors).

The system operator can then facilitate creation of an EI for each of the unknown errors (step 1138) and can then facilitate creation of a signature file 850 for the created EIs (step 1140). By facilitating creation of the EI and signature file, the operator can indicate to the processing software 490 that an EI and associated signature file are desired. The system operator can then facilitate a rerun of the processing software 490 on the log file(s) 650 (with the newly created signature file 850) and repeat the process until all errors are documented (step 1142). Additionally, depending on the manner of creating the new signature file 850, the signature file 850 may be amended to more accurately represent the desired error.

While the processing software 490 is described above as including certain functionality, one should note that the processing software 490 is not constrained to such functionality. More specifically, in at least one nonlimiting example, the processing software 490 may be configured to break received error logs 650 into separate files according to STT 160. Other embodiments may be configured to split error logs 650 such that each split file includes a predetermined number of errors (e.g., each split log has one error). The processing software 490 may also be configured to match analyzed errors to known EIs and create a summary report of the errors.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure. As a nonlimiting example, while this disclosure discusses television networks and STTs, one should realize that these concepts can be applied to any network (e.g, IP networks, DOCSIS networks, networks with two-way communication) with any devices that are capable of reporting error conditions.

One should also note that conditional language used in this disclosure, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Therefore, at least the following is claimed:

1. A method for detecting errors in a networked set top terminal (STT), comprising:

receiving an error log from at least one STT of the plurality of STTs, wherein the error log comprises error data related to at least one error that occurred in the at least one STT, wherein the error data includes a processor state field identifying a condition of a processor associated with the at least one STT at a time the at least one error occurred and an identification of a subroutine being executed at the time of the at least one error;

compiling the error data received from the at least one STT with other error data received from a plurality of STTs into a master log file;

comparing the received error data to at least one documented signature file, the at least one documented signature file including a pattern related to at least one documented error;

in response to determining that the received error data does not match the pattern related to the at least one documented error, creating and storing a new signature file, the new signature file including an error identifier and at least one pattern associated with the received error data;

creating a directory file containing a list of the at least one documented signature file and the new signature file, wherein the list of the at least one documented signature file and the new signature file is organized according to complexity, wherein a more complex signature file is positioned before a less complex signature file in the list; and analyzing the directory file to determine an error trend in the STT, wherein analyzing the directory file comprises analyzing the more complex signature file before analyzing the less complex signature file.

2. The method of claim 1, further comprising separating, in the master log file, the received error data according to STT.

3. The method of claim 1, further comprising separating, in the master log file, the received error data according to the at least one pattern associated with the received error data.

4. The method of claim 1, wherein the error log is received pursuant to an STT reboot.

5. The method of claim 1, wherein the error data is received aperiodically over a predetermined interval of time.

6. The method of claim 1, further comprising creating a summary report of detected errors.

7. A computer readable memory having a computer program for detecting errors in a set top terminal (STT), comprising:

logic configured to receive, from at least one STT, an error log comprising error data related to at least one error that occurred in the at least one STT, wherein the error data includes a processor state field identifying a condition of a processor associated with the at least one STT at a time the at least one error occurred and an identification of a subroutine being executed at the time of the at least one error;

logic configured to compile the error log with a plurality of error logs received from a plurality of STTs into a master log file;

logic configured to compare the received error data to at least one signature file, the at least one signature file including a pattern related to at least one documented error;

logic configured to, in response to determining that the received error data does not match the pattern related to the at least one documented error, facilitate creation and storage of a new signature file in said computer readable memory, the new signature file including an error identifier and at least one pattern associated with the received error data;

logic configured to create a directory file containing a list of the at least one documented signature file and the new signature file, wherein the list of the at least one documented signature file and the new signature file is organized according to complexity, wherein a more complex signature file is positioned before a less complex signature file in the list; and logic to analyze the directory file to determine an error trend in the STT, wherein logic to analyze the directory file comprises logic to analyze the more complex signature file before analyzing the less complex signature file.

8. The computer readable memory of claim 7, wherein the master log file comprises error data related to the plurality of STTs.

9. The computer readable memory of claim 8, further comprising logic configured to separate, in the master log file, the received error data according to STT.

10. The computer readable memory of claim 7, further comprising logic configured to separate, in the master log file, the received error data according to error pattern.

11. The computer readable memory of claim 7, further comprising logic configured to create a directory for storing the received error data.

12. The computer readable memory of claim 7, wherein the error data is received aperiodically over a predetermined interval of time.

13. A control system for detecting errors in a set top terminal (STT), comprising:

a memory; and a processor being configured to operate in accordance to:

error collecting logic configured to enable the processor to receive error logs from a plurality of, the error collecting logic further being configured to enable the processor to create a log file from the received error logs;

error compiling logic configured to enable the processor to compile the error logs received from the plurality of STTs into a master log file;

error processing logic configured to enable the processor to receive the log file, the error processing logic further being configured to enable the processor to separate error data related to an STT and determine whether the error data is associated with a documented error;

error documentation logic configured to enable the processor to create a new signature file including an error identifier and at least one pattern associated with the received error data in response to determining that the error data is not associated with the at least one documented error, and to store in the memory a plurality of signature files for the error data, wherein the error data includes a processor state field identifying the condition of a processor associated with the STT at a time an error occurred and an identification of a subroutine being executed at the time of the error;

error directory file logic configured to create and store, in the memory, a directory file containing a list of the plurality of signature files, wherein the list of the at least one documented signature file and the new signature file is organized according to complexity, wherein a more complex signature file is positioned before a less complex signature file in the list; and error analyzing logic configured to analyze the directory file to determine an error trend in the STT, wherein the error analyzing logic is configured to analyze the directory file comprises analyzing the more complex signature file before analyzing the less complex signature file.

14. The system of claim 13, wherein the error processing logic further separates the master log file into a plurality of individual STT files, each individual STT file corresponding to a single STT.

15. The system of claim 13, wherein the error processing logic further separates the master log file into a plurality of individual error files, each individual error file corresponding to a single error.

16. The system of claim 13, wherein the error collecting logic further receives error logs aperiodically over a predetermined interval of time.

* * * * *